United States Patent
Teraoka

(10) Patent No.: US 12,043,737 B2
(45) Date of Patent: Jul. 23, 2024

(54) VIBRATION-DAMPING MOLDED ARTICLE AND METHOD FOR PRODUCING RESIN COMPOSITION FOR VIBRATION-DAMPING MOLDED ARTICLE

(71) Applicant: Polyplastics Co., Ltd., Tokyo (JP)

(72) Inventor: Takanobu Teraoka, Fuji (JP)

(73) Assignee: POLYPLASTICS CO., LTD., Tokyo (JP)

( * ) Notice: Subject to any disclaimer, the term of this patent is extended or adjusted under 35 U.S.C. 154(b) by 0 days.

(21) Appl. No.: 17/906,004

(22) PCT Filed: Mar. 9, 2021

(86) PCT No.: PCT/JP2021/009138
§ 371 (c)(1),
(2) Date: Sep. 9, 2022

(87) PCT Pub. No.: WO2021/187218
PCT Pub. Date: Sep. 23, 2021

(65) Prior Publication Data
US 2023/0109288 A1 Apr. 6, 2023

(30) Foreign Application Priority Data

Mar. 17, 2020 (JP) .................................. 2020-046358

(51) Int. Cl.
*C08L 81/04* (2006.01)
*C08K 3/34* (2006.01)
*C08K 9/04* (2006.01)
*C08K 3/22* (2006.01)

(52) U.S. Cl.
CPC .............. *C08L 81/04* (2013.01); *C08K 3/346* (2013.01); *C08K 9/04* (2013.01); *C08K 2003/2237* (2013.01)

(58) Field of Classification Search
CPC ........... C08L 81/04; C08K 3/346; C08K 9/04; C08K 2003/2237
USPC ........................................................ 523/206
See application file for complete search history.

(56) References Cited

U.S. PATENT DOCUMENTS

| | | | |
|---|---|---|---|
| 2006/0122326 A1* | 6/2006 | Okamoto | C08L 77/06 525/422 |
| 2018/0134931 A1* | 5/2018 | Sasaki | C08L 53/02 |
| 2020/0300327 A1 | 9/2020 | Oda et al. | |

FOREIGN PATENT DOCUMENTS

| | | |
|---|---|---|
| CN | 105949608 A | 9/2016 |
| EP | 3431548 A1 | 1/2019 |
| EP | 3450500 A1 | 3/2019 |
| JP | 2002-356574 A | 12/2002 |
| JP | 2003-292746 A | 10/2003 |
| JP | 2005-307094 A | 11/2005 |
| JP | 2006-152020 A | 6/2006 |
| JP | 2008-075087 A | 4/2008 |
| JP | 4460426 B2 | 5/2010 |
| JP | 2011-148960 A | 8/2011 |
| JP | 2012-171989 A | 9/2012 |
| JP | 2015-203062 A | 11/2015 |
| WO | WO 2019/107449 A1 | 6/2019 |

OTHER PUBLICATIONS

SANWAX 161-P, Sanyo Chemical, website <https://www.sanyo-chemical.co.jp/products/en/154/>. (Year: 2023).*
Igranox 101, Industrial Coatings, Technical Data Sheet, BASF, website < https://dispersions-resins-products.basf.us/files/technical-datasheets/Irganox_1010_April_2015_R2_IC.pdf>, Apr. 2015. (Year: 2015).*
English Translation of JP 2007-197553. (Year: 2007).*
Ruixue, Liu et al. "Polymer materials", pp. 288-289, Henan University Press, Sep. 2018.

* cited by examiner

*Primary Examiner* — Hannah J Pak
(74) *Attorney, Agent, or Firm* — KNOBBE, MARTENS, OLSON & BEAR LLP

(57) ABSTRACT

A molded article which exhibits an improved vibration-damping effect. The vibration-damping molded article includes a resin composition including at least a thermoplastic resin A, an olefin-based elastomer B having a reactive functional group, and an inorganic filler C, wherein the inorganic filler C is coated with the olefin-based elastomer B.

5 Claims, 1 Drawing Sheet

VIBRATION-DAMPING MOLDED ARTICLE AND METHOD FOR PRODUCING RESIN COMPOSITION FOR VIBRATION-DAMPING MOLDED ARTICLE

This application is the U.S. National Phase under 35 U.S.C. § 371 of International Application PCT/JP2021/009138, filed Mar. 9, 2021, designating the U.S., and published in Japanese as WO 2021/187218 on Sep. 23, 2021, which claims priority to Japanese Patent Application No. 2020-046358, filed Mar. 17, 2020, the entire content of which is incorporated herein by reference.

TECHNICAL FIELD

The present invention relates to a molded article having vibration-damping properties, for use in household electric appliances, automobiles, and the like, and to a molded article having improved vibration-damping properties compared to existing articles.

BACKGROUND ART

Noises and vibrations caused by the growth of transport facilities, and work environments at workplaces have recently become an object of public concern. In regard to domestic spaces, the pursuit of comfort has led to widespread demand for household electric appliances and the like that generate a reduced level of noise, vibration and the like, and in regard to automobiles, the requirement to improve the cabin environment has led to widespread demand for soundproofing and vibration-proofing materials.

Vibration-damping materials made of a resin are effective for the reduction of sound and vibration, and, for example, an attempt to knead a raw material or the like excellent in vibration-damping properties into the resin has been made. For example, Patent Document 1 discloses that a resin composition comprising a thermoplastic resin component, a polymeric material composed of an elastomer component, and inorganic filler exhibits excellent rigidity and vibration-damping properties.

In addition, Patent Document 2 discloses that a resin comprising a polyester and a polyolefin, as well as an ethylene-glycidyl methacrylate-styrene copolymer serves as a vibration-damping material excellent in impact resistance and resistance to repeated flexing. Further, Patent Document 3 proposes an improvement method by using a resin composition comprising at least four components, i.e., a vinyl polymer such as a ternary copolymer of an α-olefin, an α,β-unsaturated carboxylic acid ester and an α,β-unsaturated carboxylic acid glycidyl ester, a polyester resin, a rubbery elastomer resin, and an inorganic layered compound.

Patent Document 1: Japanese Unexamined Patent Application, Publication No. 2015-203062
Patent Document 2: Japanese Unexamined Patent Application, Publication No. 2011-148960
Patent Document 3: Japanese Patent No. 4460426

DISCLOSURE OF THE INVENTION

Problems to Be Solved By the Invention

Although the vibration-damping effect of the vibration-damping material mentioned above has been observed, the demand for vibration-damping performance has increased in recent years, and further improvement is desired.

It is an object of the present invention to provide a molded article which exhibits an improved vibration-damping effect compared to that previously achieved.

Means for Solving the Problems

The object of the present invention has been achieved by the following. A first aspect of the present invention relates to a vibration-damping molded article comprising a resin composition comprising at least a thermoplastic resin A, an olefin-based elastomer B having a reactive functional group, and an inorganic filler C, wherein the inorganic filler C is coated with the olefin-based elastomer B. A second aspect of the present invention relates to the vibration-damping molded article according to the first aspect, wherein the olefin-based elastomer B is an epoxy-group-containing, olefin-based copolymer, and has at least a structural unit derived from an α-olefin and a structural unit derived from an α,β-unsaturated acid glycidyl ester. A third aspect of the present invention relates to the vibration-damping molded article according to the first or second aspect, wherein the inorganic filler C is mica or a potassium titanate whisker. A fourth aspect of the present invention relates to a method for producing a resin composition for a vibration-damping molded article, comprising melt-kneading an olefin-based elastomer B and an inorganic filler C, subsequently adding a thermoplastic resin A to the melt-kneaded olefin-based elastomer B and inorganic filler C, and performing further melt-kneading.

Effects of the Invention

The present invention can provide a vibration-damping molded article which exhibits an improved vibration-damping effect compared to that previously achieved.

PREFERRED MODE FOR CARRYING OUT THE INVENTION

Figure 1:
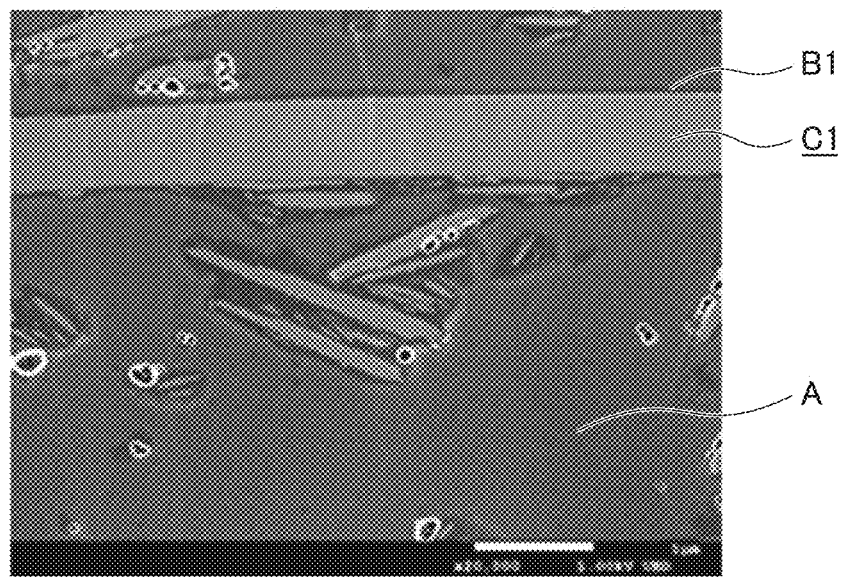
FIG. 1 is an electron microscope (×20000 magnification) photograph of a cross section of a molded article of Example 2 of the present invention.
Figure 2:
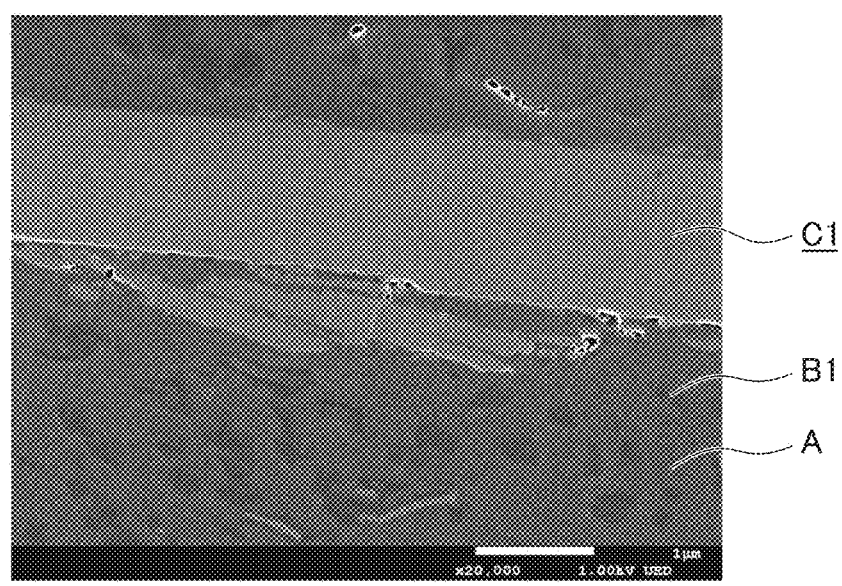
FIG. 2 is an electron microscope (×20000 magnification) photograph of a cross section of a molded article of Comparative Example 2.

A vibration-damping molded article according to an embodiment of the present invention comprises a resin composition comprising at least a thermoplastic resin A, an olefin-based elastomer B having a reactive functional group, and an inorganic filler C, wherein the inorganic filler C is coated with the olefin-based elastomer B.

<Thermoplastic Resin A>

A crystalline thermoplastic resin and an amorphous thermoplastic resin are suitably used as the thermoplastic resin A of the embodiment of the present invention. Examples of the crystalline thermoplastic resin include a polyacetal resin (POM), a polybutylene terephthalate resin (PBT), a polyethylene terephthalate resin (PET), a polyphenylene sulfide resin (PPS), a polyamide resin (PA), and the like. Any crystalline thermoplastic resin with melt moldability can be used as the thermoplastic resin A.

Examples of the amorphous thermoplastic resin include a polycarbonate resin (PC), an acrylic resin, a styrene-based resin, a cyclic olefin (co)polymer (COP, COC), and the like, and, in particular, a polycarbonate resin, and a cyclic olefin (co)polymer are favorably used from the viewpoint of thermal resistance. The thermoplastic resin A of the embodiment of the present invention can be produced by any conventional method.

<Olefin-Based Elastomer B Having Reactive Functional Group>

The olefin-based elastomer B having a reactive functional group (hereinafter, also simply referred to as "olefin-based elastomer B") of the embodiment of the present invention is preferably an epoxy-group-containing, olefin-based copolymer, and is characterized by having at least a structural unit derived from an α-olefin and a structural unit derived from an α,β-unsaturated acid glycidyl ester.

C2-4 olefins such as ethylene and propylene can be used as the α-olefin, and ethylene and propylene are preferable. Glycidyl acrylate and glycidyl methacrylate are preferably used as the α,β-unsaturated acid glycidyl ester. In addition, a third component such as a C1-12 (meth)acrylic acid ester, and vinyl acetate may be copolymerized.

The amounts of the olefin and the glycidyl ester in the copolymer may be adjusted in the range of 30 to 90 mol %, and 70 to 10 mol %, respectively, and the third component may be contained in an amount ranging from 0 to 30 mol %.

In the embodiment of the present invention, the use of an ethylene-glycidyl methacrylate copolymer (hereinafter, also referred to as "EGMA") is particularly preferable. The ratio of glycidyl methacrylate to ethylene is not particularly limited, and is in the range of 1 to 30 parts by mass, preferably 3 to 20 parts by mass, and more preferably 8 to 15 parts by mass based on 100 parts by mass of the copolymer when the mass of units at modified sites of the copolymer are converted to the mass of the respective corresponding monomers.

<Inorganic Filler C>

Examples of the inorganic filler C contained in the molded article according to the embodiment of the present invention include glass fibers, glass flakes, glass beads, silica, talc, mica, potassium titanate whiskers, calcium titanate, and the like, and mica and potassium titanate whiskers are particularly preferable. The fiber length of the inorganic filler (before the preparation of the composition through melt-kneading, etc.) preferably ranges from 0.01 to 10 mm, and the diameter of the inorganic filler preferably ranges from 5 to 20 μm.

The inorganic filler of the embodiment of the present invention is characterized in that the surface thereof is coated with the olefin-based elastomer B. Whether the inorganic filler C is coated can be determined by observation of a cross section of the molded article by SEM, or the method described below (hereinafter, also referred to as coating confirmation method).

The inorganic filler C coated with the olefin-based elastomer B can be produced by a coating treatment process in which the olefin-based elastomer B and the inorganic filler C are melt-kneaded. The inorganic filler C coated with the olefin based elastomer B on the surface thereof is melt-kneaded with the thermoplastic resin A. The thermoplastic resin A and an excess olefin-based elastomer B, which are not involved in the coating, are removed using a solvent capable of dissolving both the thermoplastic resin A and the olefin-based elastomer B. Then, the coated inorganic filler C is subjected to measurement by FT-IR.

If the absorption caused by the olefin-based elastomer B is observed in the FT-IR compared with an uncoated inorganic filler, the inorganic filler is found to be coated with the olefin-based elastomer B (hereinafter, also referred to as coating confirmation method).

The resin composition for a molded article can be produced by performing a production process in which the surface of the inorganic filler is coated with the olefin-based elastomer B, then adding the thermoplastic resin A to the coated inorganic filler, and performing further melt-kneading. Thus, a molded article can be obtained in which the inorganic filler coated with the olefin-based elastomer B is dispersed in the thermoplastic resin A.

During the melt-kneading with the thermoplastic resin A, a further olefin-based elastomer B may be added in addition to the olefin-based elastomer B that has coated the inorganic filler.

In the present invention, the inorganic filler C is contained in an amount of preferably 20 to 200 parts by mass, and more preferably 30 to 160 parts by mass with respect to 100 parts by mass of the thermoplastic resin A.

<Other Components>

In the present invention, known additives generally added to thermoplastic resins and thermosetting resins, more specifically, a burr inhibitor, a release agent, a lubricant, a plasticizer, a flame retardant, a coloring agent such as a dye or a pigment, a crystallization promoter, a crystal nucleating agent, various antioxidants, a heat stabilizer, a weatherability stabilizer, a corrosion inhibitor, and the like may be blended in addition to the components described above, so long as the effects of the invention are not impaired.

<Molded Article>

A molded article according to another embodiment of the present invention is obtained by molding the resin composition for a molded article described above. The method for preparing the molded article according to this embodiment of the present invention is not particularly limited, and known methods can be employed. For example, the molded article may be produced by feeding the resin composition as described above to an extruder and melt-kneading the resin composition to form pellets, then feeding the pellets to an injection molding machine equipped with a predetermined mold, and performing injection molding.

EXAMPLES

Hereinafter, the present invention will be described in more detail with reference to Examples, but the present invention is not limited thereto.

Materials

The following materials were used to prepare samples for evaluation. The amounts of the materials used are shown in Tables 1 and 2.

A1: polyphenylene sulfide resin (PPS), manufactured by Polyplastics Co., Ltd.;
A2: polybutylene terephthalate resin (PBT), manufactured by Polyplastics Co., Ltd.;
B1: ethylene-glycidyl methacrylate copolymer, Bondfast L manufactured by Sumitomo Chemical Co., Ltd.;
B2: poly(ethylene-octene): Engage 8440 manufactured by Dow Chemical Japan Limited;
C1: mica, MICALET 21PU manufactured by Yamaguchi Mica Co., Ltd.;
C2: glass fiber, PF70E-001 manufactured by Nitto Boseki Co., Ltd.;
C3: potassium titanate, TISMO N102 manufactured by Otsuka Chemical Co., Ltd.;

C4: glass fiber, ECS03T-747 manufactured by Nippon Electric Glass Co., Ltd.;
C5: glass fiber, ECS03T-187 manufactured by Nippon Electric Glass Co., Ltd.;
C1MB11: masterbatch obtained by blending B1 and C1 in a ratio of B1:C1=21:9, followed by melt-kneading;
C1MB12: masterbatch obtained by blending B1 and C1 in a ratio of B1:C1=12:18, followed by melt-kneading;
C1MB13: masterbatch obtained by blending B1 and C1 in a ratio of B1:C1=1:1, followed by melt-kneading;
C1MB2: masterbatch obtained by blending B2 and C1 in a ratio of B2:C1=21:9, followed by melt-kneading;
C2MB1: masterbatch obtained by blending B1 and C2 in a ratio of B1:C2=12:18, followed by melt-kneading;
C3MB1: masterbatch obtained by blending B1 and C3 in a ratio of B1:C3=21:9, followed by melt-kneading;
D: antioxidant, Irganox 1010 (tetrakis(3-(3,5-di-tert-butyl-4-hydroxyphenyl)propionate) manufactured by BASF Japan Ltd.; and
E: lubricant, SANWAX 161-P polyethylene wax manufactured by Sanyo Chemical Industries, Ltd.

<Production of Resin Compositions>

The masterbatches were prepared by kneading B and C in the amounts specified in Tables 1 and 2 at a cylinder temperature of 190° C., and then pelletizing the kneaded material. In Examples 1 to 5 and Comparative Examples 1 to 9, the thermoplastic resin A1 and the pelletized masterbatch were kneaded at a cylinder temperature of 320° C. and then injection molded to prepare a molded article, which was a test piece (200 mm10 mm×1.6 mt). In Example 6 and Comparative Example 10, the thermoplastic resin A2 and the pelletized masterbatch were kneaded at a cylinder temperature of 260° C. and then injection molded to prepare a molded article, which was a test piece (200 mm×10 mm×1.6 mt). The coating confirmation method described above confirmed that the inorganic filler C was coated with the olefin-based elastomer B.

<Evaluation>

The loss factor was determined from the full width at half maximum of the mechanical impedance at an antiresonance point, as determined by the central exciting method. The apparatus used was a loss factor measuring apparatus manufactured by Ono Sokki Co., Ltd. The results are shown in Tables 1 and 2. It should be noted that the measurement was performed under an atmosphere of 23° C. and 50% RH, unless otherwise specified.

<Results of Evaluation>

TABLE 1

| Material | Example | | | | | |
|---|---|---|---|---|---|---|
| | 1 | 2 | 3 | 4 | 5 | 6 |
| $A_1$ | 100 | 100 | 100 | 100 | 100 | |
| $A_2$ | | | | | | 100 |
| $C_{1MB11}$ | 43.8 | | | | | |
| $C_{1MB12}$ | | 43.8 | | | 77.9 | |
| $C_{1MB13}$ | | | | | | 40.6 |
| $C_{2MB1}$ | | | 43.8 | | | |
| $C_{3MB1}$ | | | | 43.8 | | |
| $C_4$ | | | | | 77.9 | |
| $C_5$ | | | | | | 61.0 |
| D | 0.7 | 0.7 | 0.7 | 0.7 | 1.3 | 0.6 |
| E | 1.5 | 1.5 | 1.5 | 1.5 | 2.6 | 1.0 |
| Parts by mass of components in masterbatch | | | | | | |
| $B_1$ (calculated) | 30.7 | 17.5 | 17.5 | 30.7 | 31.2 | 20.3 |
| $C_1$ (calculated) | 13.1 | 26.3 | | 17.5 | 46.8 | 20.3 |
| $C_2$ (calculated) | | | 26.3 | | | |
| $C_3$ (calculated) | | | | 13.1 | | |
| Loss factor | | | | | | |
| 0.1-0.4 KHz | 0.013 | 0.018 | 0.009 | 0.015 | 0.014 | 0.012 |
| 0.6-1.4 KHz | 0.014 | 0.021 | 0.010 | 0.018 | 0.015 | 0.014 |
| 3.1-4.5 KHz | 0.024 | 0.031 | 0.013 | 0.021 | 0.022 | 0.018 |

TABLE 2

| Material | Comparative Example | | | | | | | | | |
|---|---|---|---|---|---|---|---|---|---|---|
| | 1 | 2 | 3 | 4 | 5 | 6 | 7 | 8 | 9 | 10 |
| $A_1$ | 100 | 100 | 100 | 100 | 100 | 100 | 100 | 100 | 100 | |
| $A_2$ | | | | | | | | | | 100 |
| $B_1$ | 30.7 | 17.5 | 17.5 | 31.2 | 30.7 | 27.1 | | | | 20.3 |
| $B_2$ | | | | | | | | | 30.7 | |
| $C_1$ | 13.1 | 26.3 | | 46.8 | | | 22.4 | | 13.1 | 20.3 |
| $C_{1MB2}$ | | | | | | | | 43.8 | | |
| $C_2$ | | | 26.3 | | | | | | | |
| $C_3$ | | | | | 13.1 | | | | | |
| $C_4$ | | | | | 77.9 | | | | | |
| $C_5$ | | | | | | | | | | 61.0 |
| D | 0.7 | 0.7 | 0.7 | 1.3 | 0.7 | 0.6 | 0.6 | 0.7 | 0.7 | 0.6 |
| E | 1.5 | 1.5 | 1.5 | 2.6 | 1.5 | 1.3 | 1.2 | 1.5 | 1.5 | 1.0 |
| Parts by mass of components in masterbatch | | | | | | | | | | |
| $B_2$ (calculated) | | | | | | | | 30.7 | | |
| $C_1$ (calculated) | | | | | | | | 13.1 | | |
| Loss factor | | | | | | | | | | |
| 0.1-0.4 KHz | 0.009 | 0.007 | 0.006 | 0.010 | 0.012 | 0.006 | 0.003 | 0.009 | 0.009 | 0.007 |
| 0.6-1.4 KHz | 0.009 | 0.008 | 0.006 | 0.010 | 0.014 | 0.006 | 0.003 | 0.009 | 0.010 | 0.009 |
| 3.1-4.5 KHz | 0.013 | 0.012 | 0.008 | 0.015 | 0.019 | 0.009 | 0.005 | 0.011 | 0.011 | 0.011 |

As shown in Tables 1 and 2, it can be seen that the present invention provides a molded article with excellent vibration-damping properties.

EXPLANATION OF REFERENCE NUMERALS

A: thermoplastic resin
B1: olefin-based elastomer (EGMA)
C1: inorganic filler (mica)

The invention claimed is:

1. A vibration-damping molded article comprising a resin composition comprising a thermoplastic resin A, an olefin-based elastomer B having a reactive functional group, and an inorganic filler C, wherein the inorganic filler C is selected from the group consisting of mica, glass fiber and potassium titanate, the inorganic filler is in an amount of 13.1-46.8 parts by mass per 100 parts by mass of the thermoplastic resin A, and the inorganic filler C is coated with the olefin-based elastomer B, wherein the thermoplastic resin A is a crystalline thermoplastic resin selected from the group consisting of polyphenylene sulfide and polybutylene terephthalate, and wherein the olefin-based elastomer B is selected from the group consisting of an ethylene-glycidyl methacrylate copolymer and poly(ethylene-octene) and wherein the olefin-based elastomer B is in an amount of 17.5-31.2 parts by mass per 100 parts by mass of thermoplastic resin A.

2. A method for producing a resin composition for a vibration-damping molded article, the method comprising melt-kneading an olefin-based elastomer B and an inorganic filler C, subsequently adding a thermoplastic resin A to the melt-kneaded olefin-based elastomer B and inorganic filler C, and performing further melt-kneading, wherein the inorganic filler C is selected from the group consisting of mica, glass fiber and potassium titanate, the inorganic filler is in an amount of 13.1-46.8 parts by mass per 100 parts by mass of the thermoplastic resin A, and the inorganic filler C is coated with the olefin-based elastomer B, wherein the thermoplastic resin A is a crystalline thermoplastic resin selected from the group consisting of polyphenylene sulfide and polybutylene terephthalate, and wherein the olefin-based elastomer B is selected from the group consisting of an ethylene-glycidyl methacrylate copolymer and poly(ethylene-octene) and wherein the olefin-based elastomer B is in an amount of 17.5-31.2 parts by mass per 100 parts by mass of thermoplastic resin A.

3. The vibration-damping molded article according to claim 1, wherein the resin composition further comprises an antioxidant D and a lubricant E.

4. The vibration-damping molded article according to claim 3, wherein the antioxidant D is pentaerythritol tetrakis (3-(3,5-di-tert-butyl-4-hydroxyphenyl)propionate).

5. The vibration-damping molded article according to claim 3, wherein the lubricant E is a polyethylene wax.

* * * * *

UNITED STATES PATENT AND TRADEMARK OFFICE
CERTIFICATE OF CORRECTION

PATENT NO. : 12,043,737 B2  
APPLICATION NO. : 17/906004  
DATED : July 23, 2024  
INVENTOR(S) : Takanobu Teraoka Page 1 of 1

It is certified that error appears in the above-identified patent and that said Letters Patent is hereby corrected as shown below:

On the Title Page

Column 2 (Other Publications), Line 3, delete "Igranox" and insert -- Irganox --.

In the Specification

Column 5, Line 33 (approx.), delete "(200 mm10 mm×1.6 mt)." and insert -- (200 mm×10 mm×1.6 mt). --.

In the Claims

Column 8, Line 9, Claim 2, delete "Cis" and insert -- C is --.

Signed and Sealed this
Eighth Day of October, 2024

Katherine Kelly Vidal
*Director of the United States Patent and Trademark Office*